US010740210B1

(12) United States Patent
Schumacher et al.

(10) Patent No.: US 10,740,210 B1
(45) Date of Patent: Aug. 11, 2020

(54) KERNEL TRACING FOR A HETEROGENEOUS COMPUTING PLATFORM AND DATA MINING

(71) Applicant: Xilinx, Inc., San Jose, CA (US)

(72) Inventors: Paul R. Schumacher, Berthoud, CO (US); Kumar Deepak, San Jose, CA (US); Roger Ng, Campbell, CA (US); David K. Liddell, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 123 days.

(21) Appl. No.: 15/824,631

(22) Filed: Nov. 28, 2017

(51) Int. Cl.
*G06F 9/44* (2018.01)
*G06F 11/34* (2006.01)
*G06F 8/41* (2018.01)
*G06F 7/02* (2006.01)
*G06F 11/36* (2006.01)
*G06F 16/2458* (2019.01)

(52) U.S. Cl.
CPC ............ *G06F 11/3466* (2013.01); *G06F 7/02* (2013.01); *G06F 8/452* (2013.01); *G06F 11/3624* (2013.01); *G06F 16/2465* (2019.01)

(58) Field of Classification Search
CPC .... G06F 11/3466; G06F 16/2465; G06F 7/02; G06F 8/452; G06F 11/3624
USPC ................................................ 717/124, 140
See application file for complete search history.

(56) References Cited

U.S. PATENT DOCUMENTS 6,389,379 B1 * 5/2002 Lin ..................... G06F 17/5022
703/14

OTHER PUBLICATIONS

Specification and drawing for U.S. Appl. No. 14/887,080, filed Oct. 19, 2015, Schumacher et al.
Xilinx, "Application Profiling in the SDAccel Environment," UG1023 (v.2016.5), Mar. 9, 2017, pp. 36-55, Xilinx, Inc., San Jose, California, USA.
Specification and drawing for U.S. Appl. No. 15/824,789, filed Nov. 28, 2017, Liddell et al.

* cited by examiner

*Primary Examiner* — Chuck O Kendall
(74) *Attorney, Agent, or Firm* — Kevin T. Cuenot

(57) ABSTRACT

Tracing operation of a kernel can include comparing, using a processor, signals of a compiled kernel with a database including compiler generated signals for compute units to determine a list of the signals of the compiled kernel that match the compiler generated signals and generating trace data by emulating the compiled kernel using the processor. The trace data includes values for signals of the compiled kernel collected over time during the emulation. Operational data corresponding to individual compute units of the compiled kernel can be determined from values of the signals of the list within the trace data using the processor. The operational data can be displayed using the processor.

20 Claims, 13 Drawing Sheets

500

510 

| Name | Value | Waveform View |
|---|---|---|
| 515 { ˅ Device "xilinx:adm_pcie-7v3:1ddr3.0" | | |
| ˅ Binary Container "ddr_speed" | | |
| ˅ Kernel Data Transfer | | |
| 520 { > Read Address | | 0000000000000000000000000000000000 |
| > Read Data | | 0000000000000000000000000000000000 |
| > Write Address | | 0⎕ |
| > Write Data | | 0⎕ |
| 525 { ˅ Kernel "ddr_speed" 1:1:1 | | Running |
| 530 { ˅ Compute Unit: ddr_speed_1 | | 0.00% |
| > CU Stalls (%) | 16.67% | |
| ˅ Loop Pipeline Activity | | |
| > Data Transfers | | |
| ˅ User Functions | | |
| ˅ Function: DdrSpeedLow | Running | Running |
| 535 { ˅ Function Stalls | stall | |
| Intra-Kernel Stream | stall | |
| External Memory | | |
| Inter-Kernel Pipe | | |
| ˅ Loop Pipeline Activity | | |
| ˅ Intra-Kernel Streams | | |

FIG. 5B

| Name | Value | Waveform View |
|---|---|---|
| Device "xilinx:adm_pcie-7v3:1ddr3.0" | | |
| Binary Container "binary_container_1" | | |
| Kernel Data Transfer | | |
| Read Address | | ▯  ▯  ▯  ▯ |
| Read Data | | ▯  ▯  ▯  ▯ |
| Write Address | | ▯  ▯  ▯  ▯ |
| Write Data | | ▯  ▯  ▯  ▯ |
| Kernel "median" 1:1:1 | | |
| Compute Unit: median_1 | Running | Address=0000000000011c00 |
| CU Stalls (%) | | ▯  ▯  ▯  Burst Length = 8 |
| Intra-Kernel Stream | | Burst Size = 64 |
| External Memory | | ▯  ▯  ▯  Burst Type = INCR |
| Inter-Kernel Pipe | | Cache Type = 0011 |
| Data Transfers | | Privileged = No |
| m_axi_gmem | | Secure = Yes |
| | | Mem Type = Data |
| Read Address | | ▯  ▯ Locked = No |
| Read Data | | ▯  ▯  ▯  ▯ |
| Write Address | | ▯  ▯  ▯  ▯ |
| Write Data | | ▯  ▯  ▯  ▯ |
| User Functions | | |
| Function: DdrSpeedLow | | |
| Function Stalls | | |
| Intra-Kernel Stream | | |
| External Memory | | |
| Inter-Kernel Pipe | | |
| Function I/O | | |
| channel | 0 | X X X X X |
| p_read | 003b1c17 | X X X X X |
| p_read1 | 003b1c17 | X X X X X |
| p_read2 | 003a1b16 | X X X X X |

Compute Units: Running Time and Stalls

| Compute Unit | Running Time (us) | Intra-Kernel Stream Stalls (%) | External Memory Stalls (%) | Inter-Kernel Pipe Stalls (%) |
|---|---|---|---|---|
| ddr_speed_1 | 44.800 | 52.913 | 91.540 | 0.0 |

Functions: Running Time and Stalls

| Compute Unit | Function | Running Time (us) | Intra-Kernel Stream Stalls (%) | External Memory Stalls (%) | Inter-Kernel Pipe Stalls (%) |
|---|---|---|---|---|---|
| ddr_speed_1 | DdrSpeedLow | 44.795 | 52.913 | 91.540 | 0.0 |
| ddr_speed_1 | DdrSpeedLow/Aloader8 | 44.520 | 0.0 | 87.266 | 0.0 |
| ddr_speed_1 | DdrSpeedLow/Cwriter | 44.785 | 52.913 | 58.248 | 0.0 |

Compute Units: Port Data Transfer

| Compute Unit | Port | Write Time (us) | Outstanding Write (%) | Read Time (us) | Outstanding Read (%) |
|---|---|---|---|---|---|
| ddr_speed_1 | m_axi_gmem | 0.0 | 0.0 | 44.205 | 98.672 |
| ddr_speed_1 | m_axi_gmem2 | 44.170 | 98.594 | 0.0 | 0.0 |

Functions: Port Data Transfer

| Compute Unit | Function | Port | Write Time (ms) | Outstanding Write (%) | Read Time (ms) | Outstanding Read (%) |
|---|---|---|---|---|---|---|
| ddr_speed_1 | DdrSpeedLow | a | 0 | 0 | 44.205 | 98.672 |
| ddr_speed_1 | DdrSpeedLow | c | 44.170 | 98.594 | 0 | 0 |
| ddr_speed_1 | DdrSpeedLow/Aloader0 | a | 0 | 0 | 44.205 | 98.672 |
| ddr_speed_1 | DdrSpeedLow/Cwriter0 | c | 44.170 | 98.594 | 0 | 0 |
| ddr_speed_2 | DdrSpeedLow | a | 0 | 0 | 44.205 | 98.672 |
| ddr_speed_2 | DdrSpeedLow | c | 44.170 | 98.594 | 0 | 0 |
| ddr_speed_2 | DdrSpeedLow/Aloader0 | a | 0 | 0 | 44.205 | 98.672 |
| ddr_speed_2 | DdrSpeedLow/Cwriter0 | c | 44.170 | 98.594 | 0 | 0 |

Functions: Loop Activity

| Compute Unit | Function | Loop | Running Time (ms) | Running Utilization (%) |
|---|---|---|---|---|
| ddr_speed_1 | DdrSpeedLow/Aloader0 | 0 | 24.56 | 54.821 |
| ddr_speed_1 | DdrSpeedLow/Aloader0 | 1 | 20.80 | 48.660 |
| ddr_speed_1 | DdrSpeedLow/Cwriter0 | 0 | 31.74 | 70.848 |
| ddr_speed_1 | DdrSpeedLow/Cwriter0 | 1 | 12.24 | 27.321 |
| ddr_speed_2 | DdrSpeedLow/Aloader0 | 0 | 24.56 | 54.821 |
| ddr_speed_2 | DdrSpeedLow/Aloader0 | 1 | 21.81 | 48.660 |
| ddr_speed_2 | DdrSpeedLow/Cwriter0 | 0 | 31.74 | 70.848 |
| ddr_speed_2 | DdrSpeedLow/Cwriter0 | 1 | 12.24 | 27.321 |

FIG. 11B

KERNEL TRACING FOR A HETEROGENEOUS COMPUTING PLATFORM AND DATA MINING

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to emulating kernel hardware of a heterogeneous computing platform to generate trace data and to data mining the trace data for the kernel hardware.

BACKGROUND

A heterogeneous computing platform (HCP) refers to a data processing system that includes a host processor (host) coupled to one or more other devices through interface circuitry. The devices are architecturally different from the host. The host is capable of offloading processing jobs to the devices. The devices are capable of performing the processing jobs and making the results available to the host. Typically, the host is implemented as a central processing unit. Examples of the devices include, but are not limited to, graphics processing units (GPUs) and digital signal processors (DSPs).

Open Computing Language (OpenCL) is an example of a framework for writing programs that execute on an HCP. An OpenCL application includes host program code and kernel program code. The host program code is compiled to execute on the host. The kernel program code is compiled to execute on a particular type of device. The devices perform processing jobs offloaded from the host through execution of the compiled kernel program code.

SUMMARY

In one or more embodiments, a method can include comparing, using a processor, signals of a compiled kernel with a database specifying compiler generated signals for compute units to determine a list of the signals of the compiled kernel that match the compiler generated signals. The method can include generating trace data by emulating the compiled kernel using the processor, wherein the trace data includes values for signals of the compiled kernel collected over time during the emulation. The method can include determining, from values of the signals of the list within the trace data and using the processor, operational data corresponding to individual compute units of the compiled kernel. The method can also include displaying, using the processor, the operational data.

In one or more embodiments, a system includes a memory configured to store program code and a processor coupled to the memory. The processor, in response to executing the program code, is configured to initiate operations. The operations include comparing signals of a compiled kernel with a database specifying compiler generated signals for compute units to determine a list of the signals of the compiled kernel that match the compiler generated signals. The operations can include generating trace data by emulating the compiled kernel. The trace data can include values for signals of the compiled kernel collected over time during the emulation. The operations can include determining, from values of the signals of the list within the trace data, operational data corresponding to individual compute units of the compiled kernel. The operations can also include displaying the operational data.

In one or more embodiments, a computer program product includes a computer readable storage medium having program code stored thereon. The program code is executable by a processor to perform operations. The operations include comparing signals of a compiled kernel with a database specifying compiler generated signals for compute units to determine a list of the signals of the compiled kernel that match the compiler generated signals. The operations can include generating trace data by emulating the compiled kernel. The trace data can include values for signals of the compiled kernel collected over time during the emulation. The operations can include determining, from values of the signals of the list within the trace data, operational data corresponding to individual compute units of the compiled kernel. The operations can also include displaying the operational data.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 5A and 5B, taken collectively, illustrate an example user interface for displaying trace data generated through hardware emulation.

FIG. 6 illustrates another example user interface for displaying trace data generated through hardware emulation.

FIGS. 11A and 11B, taken collectively, illustrates an example of a user interface showing data mining results.

DETAILED DESCRIPTION

Figure 1:
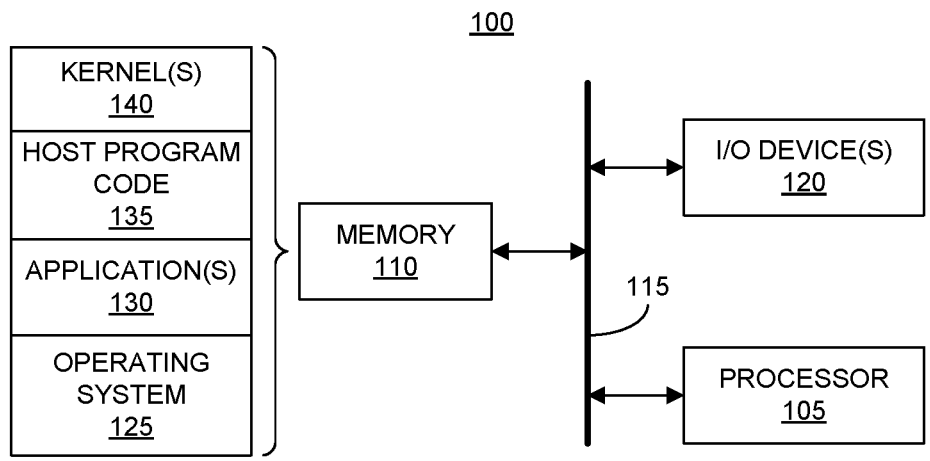
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to emulating kernel hardware of a heterogeneous computing platform to generate trace data and to data mining the trace data for the kernel hardware. Kernels are typically written in a high-level programming language such as C, C++, and/or OpenCL C. In some cases, the kernels are compiled into executable program code that is provided to a device of a heterogeneous computing platform (HCP) for execution. In other cases, the HCP includes one or more devices capable of hardware accelerating the kernels. An example of a device capable of hardware accelerating a kernel is a programmable integrated circuit (IC) such as a field programmable gate array (FPGA).

Hardware acceleration refers to implementing the functionality of a portion of program code, e.g., a kernel or kernels, in hardware or circuitry. The hardware implementation of a kernel (e.g., the hardware accelerated kernel) is functionally equivalent to the high-level program code of the kernel. Rather than execute compiled program code of the kernel, the kernel is implemented as circuitry configured to perform the task. A hardware accelerated kernel usually provides improved performance compared to executing the kernel using some sort of processor. For a device such as a programmable IC, the kernel is compiled into a circuit design that is implemented within the programmable IC, thereby implementing the kernel as hardware therein.

Hardware acceleration typically involves compiling kernels using a hardware compiler (e.g., an electronic design automation (EDA) tool) into a hardware description language representation. The compilation process is largely automated with much of the process being abstracted or hidden from the kernel developer. Compilation of the kernels typically includes high-level synthesis performed on the kernels.

Compilation may also include processes that integrate the kernels into a base platform. The base platform may include a circuit board to which the programmable IC is coupled. The base platform further may include predefined static circuitry implemented within the programmable circuitry of the programmable IC. The hardware accelerated kernels are compiled for implementation within the programmable circuitry and couple to the static circuitry. The static circuitry provides interfaces to the hardware accelerated kernels that allow the hardware accelerated kernels to communicate with the host, the circuit board, and/or other devices such as memory on the circuit board. The base platform is typically designed by a third-party hardware provider. Due to the high level of automation, abstraction of details, and use of a third-party platform (e.g., circuit board and static circuitry within the programmable IC to which the hardware accelerated kernel(s) are coupled), the resulting circuit design often suffers from a lack of observability by the kernel developer.

The inventive arrangements described within this disclosure address the lack of observability by facilitating hardware emulation of aspects of the HCP to generate trace data. The trace data relates, at least in part, to the hardware accelerated kernel(s) and facilitates debugging and/or testing. Further, the inventive arrangements are capable of providing different visualizations of the trace data. The visualizations can be provided at varying levels of granularity. For example, the trace data can be observed at the kernel level, the compute unit level, the function level, and/or at the port level. In one or more embodiments, the operational details can be displayed in a waveform view. In particular embodiments, the operational details are determined based upon data mining.

For purposes of description and ease of illustration, OpenCL terminology is used throughout this disclosure. It should be appreciated, however, that any of a variety of different applications written in a high-level programming language (HLL) may be hardware accelerated. In this regard, within this disclosure, the term "host program code" may refer to program code that is not hardware accelerated. For example, "host program code" may refer to program code intended to be executed by a host or other processor. The term "kernel" or "kernel program code" may refer to program code that is intended to be hardware accelerated regardless of whether the kernel program code is part of an OpenCL application. Further, while the disclosure describes embodiments involving a host and hardware accelerated kernels, the embodiments described herein may also be used within an HCP that utilizes kernels that are executed by one or more other devices.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a data processing system (system) 100 for use with one or more embodiments described herein. System 100 is capable of performing the various operations described herein relating to hardware acceleration of kernels, simulation, emulation, generating visualizations, and/or data mining. In an aspect, system 100 is implemented as a computer or other system or device that is suitable for storing and/or executing program code.

System 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 executes the program code accessed from memory 110 via interface circuitry 115.

Memory 110 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code to reduce the number of times program code must be retrieved from a bulk storage device during execution.

Memory 110 is capable of storing program code. The program code may include routines, programs, objects, components, logic, data structures, and so on. For purposes of illustration, memory 110 stores an operating system 125, one or more application(s) 130, host program code 135, and one or more kernels 140. In one or more embodiments, application(s) 130 include one or more compilers, simulators, and/or emulators. In particular embodiments, application(s) 130 include an EDA application. The EDA application is capable of performing high-level synthesis and/or a design flow (e.g., synthesis, placement, routing, and/or bitstream generation). Application(s) 130 are capable of operating on host program code 135 and/or kernels 140.

In an aspect, operating system 125 and application(s) 130, being implemented in the form of executable program code, are executed by system 100 and, more particularly, by processor 105, to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 further may include one or more input/output (I/O) devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Throughout this disclosure, various executable operations performed by a data processing system are described. In one or more embodiments, the same data processing system, e.g., a same processor, is capable of performing the operations described herein. In one or more other embodiments, different operations may be performed by two or more different data processing systems, e.g., two or more different processors. For example, a first data processing system may perform compilation, while a second data processing system performs emulation, while a third data processing system is configured to provide or display emulation results. The inventive arrangements are not intended to be limited by the particular number of data processing systems used or the distribution of computational tasks among such data processing systems. In this regard, a data processing system or "system" may refer to one or more data processing systems as described that are coupled or networked together.

Figure 2:
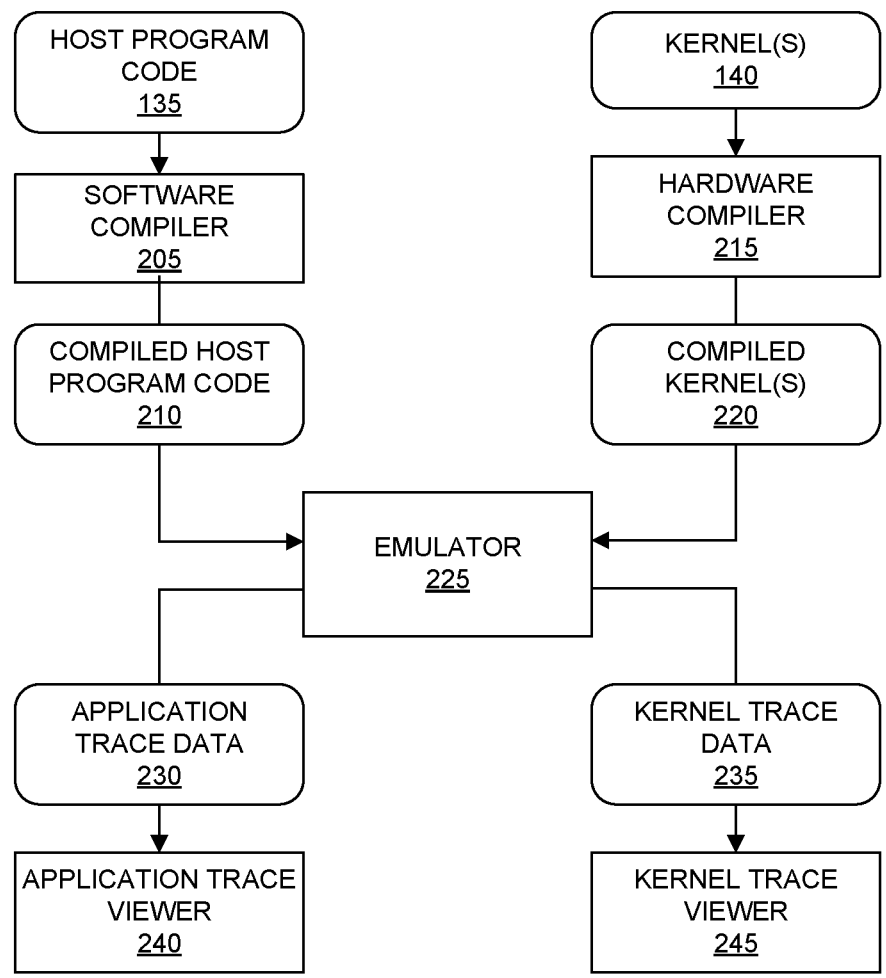
FIG. 2 illustrates an example method of generating trace data.

FIG. 2 illustrates an example method of generating trace data. The operations illustrated in FIG. 2 may be performed by a system the same as, or similar to, the system described in connection with FIG. 1. In the example of FIG. 2, host program code (e.g., source code) is provided to software compiler 205. Software compiler 205 compiles host program code 135 to generate compiled host program code 210. For example, compiled host program code 210 may be object code. One or more kernels 140 are provided to hardware compiler 215. Kernels 140 may be specified in a high-level programming language such as C, C++, or OpenCL C. Hardware compiler 215 is capable of generating compiled kernel(s) 220. Compiled kernels 220 are configured for hardware acceleration. Compiled kernel(s) 220 may be specified in a hardware description language such as Verilog, VHDL, register transfer level (RTL) format, or another suitable format. In compiling kernels 140, hardware compiler 215 is capable of modifying or adapting kernels 140 for coupling to and/or integrating into the base platform previously described.

Emulator 225 may include hardware (e.g., HDL) emulators and/or a simulator. Emulator 225 is capable of simulating compiled host program code 210 and emulating compiled kernel(s) 220 together. Emulator 225 is capable of generating trace data from the emulation. The trace data may include application trace data 230 relating to simulation of compiled host program code 210 and kernel trace data 235 relating to hardware emulation of compiled kernels 220. In the example of FIG. 2, application trace data 230 is provided to an application trace viewer 240. Kernel trace data 235 is provided to kernel trace viewer 245.

Application trace data 230 provides information relating to the timing of system events such as OpenCL application programming interface (API) calls and other aspects of the host operation. Kernel trace data 235 is capable of specifying information relating to operation of a circuit design including compiled kernels 220 within an IC with clock cycle granularity. In one or more embodiments, kernel trace data 235 specifies selected signals from a run of emulator 225 and is capable of providing a visualization of the selected signals in kernel trace viewer 245. In one or more embodiments, kernel trace viewer 245 is implemented as a waveform viewer.

Figure 3:
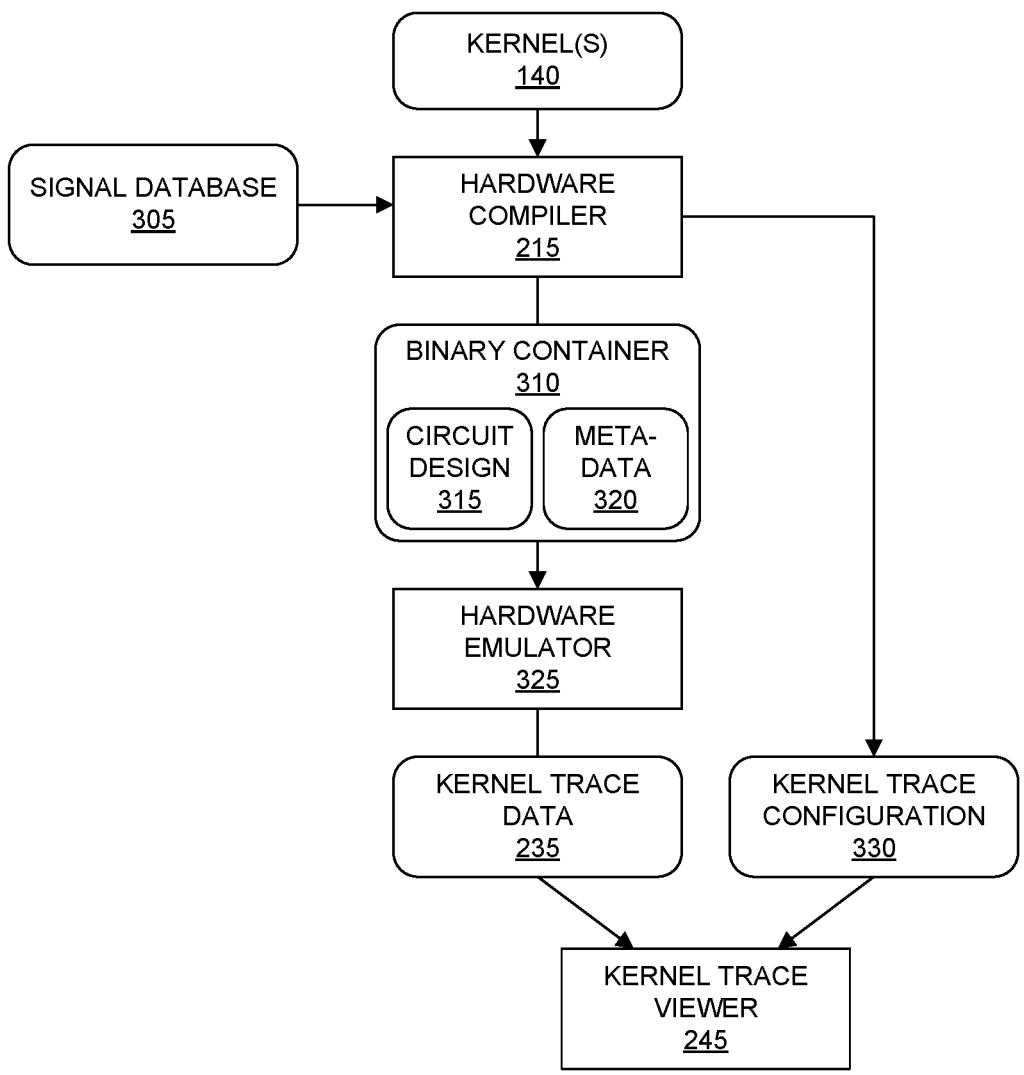
FIG. 3 illustrates another example method of generating trace data.

FIG. 3 illustrates another example method of generating trace data. The operations illustrated in FIG. 3 may be performed by a system the same as, or similar to, the system described in connection with FIG. 1. In the example of FIG. 3, kernels 140 are provided to hardware compiler 215. Hardware compiler 215 compiles kernels 140 and generates a binary container 310. Binary container 310 is a binary file that is capable of storing or including a variety of different files. In one or more embodiments, binary container 310 includes a circuit design 315 and metadata 320.

Circuit design 315 specifies the circuitry to be implemented within the target programmable IC. Circuit design 315 may be specified in a hardware description language. In another example, circuit design 315 may be specified as a kernel.xml metadata file written by hardware compiler 215 that is capable of specifying the components used and connectivity between components. In still another example, circuit design 315 may be specified as a schematic. In one or more embodiments, circuit design 315 includes both the hardware description language implementation of kernels 140 and also the hardware description language implementation of static circuitry to which the hardware accelerated kernels are coupled. The static circuitry can include interfaces for communicating with the host and a memory controller for accessing memory. Hardware compiler 215 integrates the kernels 140 with the static circuitry, e.g., establishes the connectivity between the kernels and the static circuitry, in generating circuit design 315.

Metadata 320 includes a description of the contents of circuit design 315. In an example, metadata 320 is specified as an Extensible Markup Language (XML) file. Metadata 320 may be specified in another suitable formatted file such as text, a different markup language, or as another type of data structure. Metadata 320 is capable of specifying a list of the kernels included in circuit design 315, a list of compute units within each kernel of circuit design 315, and a list of functions included in each respective compute unit of circuit design 315. Metadata 320 further is capable of specifying each port of each function and each signal for each function. Hardware compiler 215 is capable of generating metadata 320 during compilation and embedding metadata 320 within binary container 310. Metadata 320 is also capable of specifying information such as the number of values in an intra-kernel stream.

In one or more embodiments, metadata 320 further specifies details relating to the static circuitry. For example, metadata 320 is capable of specifying a list of the interfaces and other circuit blocks included in circuit design 315, the interface to which each of kernels 140 is coupled, and signals of the static circuitry.

Listing 1 is example pseudo code for a kernel 140. In the example of Listing 1, the top-level function is called "ddr_speed", which is the name of the kernel. Within "ddr_speed", additional functions such as "DdrSpeedLow", "Aloader", and "Cwriter" are defined. The arguments provided to each function are also shown.

Listing 1

```
void ddr_speed(DdrWord *a, DdrWord *c, int numWords, int stride, int bits) {
DdrSpeedLow (a, c, numWords, stride, bits);
}
void DdrSpeedLow(DdrWord *a, DdrWord *c, int numWords, int stride, int bits) {
DdrWordStream as;
# pragma HLS data_pack variable=as
# pragma HLS STREAM variable=as depth=1024
Aloader (a, as, numWords, stride);
Cwriter (c, as, numWords, stride);
}
void Aloader(DdrWord *a, DdrWordStream &as, int numWords, int stride) {
<snip>
}
void Cwriter(DdrWord *c, DdrWordStream &cs, int numWords, int stride) {
<snip>
}
```

Listing 2 is an example of metadata 320 generated by hardware compiler 215.

Listing 2

```
<device name="fpga0" fpgaDevice="virtex7:xc7vx690t:ffg1157:-2" addrWidth="33">
<core name="OCL_REGION_0" target="hw_em" type="clc_region"
clockFreq="300 MHz" numComputeUnits="2">
    <kernel name="ddr_speed" language="c"
        vlnv="xilinx.com:hls:ddr_speed:1.0"
preferredWorkGroupSizeMultiple="1" workGroupSize="1" debug="false">
...
    <module name="DdrSpeedLow">
        <module name="Aloader" instname="Aloader0">
        <rtlport name="a" protocol="m_axi"/>
        <rtlport name="numWords" protocol="ap_fifo"/>
        <rtlport name="stride" protocol="ap_fifo"/>
        <rtlport name="as" protocol="ap_fifo"/>
        </module>
        <module name="Cwriter" instname="Cwriter0">
        <rtlport name="as" protocol="ap_fifo"/>
        <rtlport name="numWords" protocol="ap_fifo"/>
        <rtlport name="stride" protocol="ap_fifo"/>
        <rtlport name="c" protocol="m_axi"/>
        </module>
    </module>
...
<instance name="ddr_speed_1">
    <addrRemap   base="0x00000000"
        port="S_AXI_CONTROL"/>
</instance>
<instance name="ddr_speed_2">
    <addrRemap   base="0x10000000"
        port="S_AXI_CONTROL"/>
</instance>
...
</kernel>
</core>
</device>
```

The example metadata in Listing 2 recites information such as the target programmable IC to be used (e.g., the particular model of programmable IC in which the circuit design is intended to operate), the OpenCL region within the target programmable IC in which kernels may be implemented, and the kernels to be implemented within that OpenCL region (e.g., a dynamically reconfigurable region of the programmable IC in which kernels are implemented and being distinct from the static region implementing static circuitry).

Listing 3 illustrates how one may interpret the metadata from Listing 2. More particularly, Listing 3 illustrates an example implementation of kernel trace configuration 330.

Listing 3

```
for (unsigned i=0; i<kernel.SizeInstance( ); ++i) {
    const Xclbin::Instance instance=kernel.GetInstance(i);
    writeInternals(xmlWriter, instance);
    writeStalls(xmlWriter, instance);
    writeDataTransfers(xmlWriter, instance);
    for (unsigned m=0; m<kernel.SizeModule( ); ++m) {
        const Xclbin::Module module=kernel.GetModule(m);
        writeInternals(xmlWriter, module);
        writeStalls(xmlWriter, module);
        writeInputsOutputs(xmlWriter, module);
        for (unsigned p=0; p<module.SizeRTLPort( ); ++p) {
            const Xclbin:: RTLPort rtlport=module.GetRTLPort
                (p);
            writeRTLPort(xmlWriter, rtlport);
        }
    }
}
```

In implementing circuit design 315 within the target programmable IC, one or more OpenCL regions and a static region are used. An OpenCL region is used to implement one or more kernels of the OpenCL application. In one aspect, the OpenCL region is a dynamically reconfigurable region of programmable circuitry within the programmable IC. As a dynamically reconfigurable region, the OpenCL region may change to implement different physical circuitry representing different kernels or groups of kernels. In another aspect, while the OpenCL region may implement one or more kernels, the OpenCL region may not be dynamically reconfigurable.

The static region is referred as "static" since the circuitry included therein is predefined as discussed. The circuitry of the static region may remain unchanged despite the circuitry of the OpenCL region being unknown until compile time of the hardware accelerated kernels. Further, in the case where the OpenCL region is a dynamically reconfigurable region, the circuitry of the static region may remain unchanged and continue to operate as circuitry in the OpenCL region changes dynamically during operation of the programmable IC to implement different hardware accelerated kernel(s).

In Listing 2, the "OCL_REGION_0" has a target operating frequency of 300 MHz and includes 2 compute units. Listing 2 includes the same or similar names drawn from the kernel source code of Listing 1. For example, Listing 2 illustrates that the kernel to be implemented in OpenCL region 0 is "ddr_speed". The metadata further describes the number of compute units within the kernel "ddr_speed", the particular modules within each compute unit, and the particular register transfer level (RTL) ports within each module. In examples described herein, compute units may be indicated by adding an extension onto the name of the kernel. For example, compute units implemented as part of the "ddr_speed" kernel may be indicated as "ddr_speed_1" and "ddr_speed_2".

During compilation, to implement kernels 140 in a hardware description language, hardware compiler 215 automatically creates a variety of different signals and inserts the signals into the resulting circuit design 315. These signals, referred to as "compiler generated signals," are signals that are not defined within kernel(s) 140 prior to compilation. For example, the compiler generated signals do not correspond to arguments or other programming language constructs specified within kernels 140 or in the example pseudo code of Listing 1, but are necessary for operation of a hardware accelerated implementation of kernels 140 within an IC. As an illustrative and non-limiting example, hardware compiler 215 is capable of inserting one or more control signals within circuit design 315 to control operation of the kernels and/or to convey the status of the kernels and/or portions of circuitry within the hardware accelerated kernels in circuit design 315. Any compiler generated signals are listed within metadata 320. An example of a compiler generated signal is an "ap_idle" signal. Hardware compiler 215 is capable of generating and inserting a signal called "ap_idle" within circuit design 315 for each compute unit of a kernel and for each function of each compute unit of a kernel. The "ap_idle" signal indicates when a kernel, a compute unit, or a function is idle (e.g., not active). For example, the "ap_idle" signal may be an active high when the compute unit is idle.

During compilation, hardware compiler 215 is also capable of accessing signal database 305 to generate kernel trace configuration 330. In one or more embodiments, signal database 305 lists signals of interest that are included in any hardware implementation of a kernel or kernels. For example, signal database 305 may specify a list of each compiler generated signals such as the various instances of the "ap_idle" signal and specify such signals on a per kernel, compute unit, function, and/or port basis. In general, signal database 305 specifies a list of the signals considered to be important or relevant for debugging and/or testing hardware accelerated kernels. Other examples of compiler generated signals include signals with standardized naming that indicates stalls for inter-kernel pipelines, external memory access, and intra-kernel streams.

In one or more embodiments, hardware compiler 215 is capable of comparing signals of circuit design 315 (e.g., the hardware accelerated kernels) as specified within metadata 320 with signals specified within signal database 305. Hardware compiler 215 is capable of including each signal of metadata 320 that matches a signal from signal database 305 within kernel trace configuration 330. In general, kernel trace configuration 330 includes a list of each signal that may be displayed within kernel trace viewer 245.

For example, hardware compiler 215 is capable of obtaining the kernel/compute unit/function name (e.g., the entire path) from metadata 320 for signals specified therein and comparing these signals to a list of signals from signal database 305. Signals specified in signal database 305 are specified generally (e.g., not for a specific circuit design). For example, the "ap_idle" signal described previously may be listed in signal database 305 as a signal of interest for kernels, as a signal of interest for compute units, and as a signal of interest for functions. As specified within metadata 320, however, the full name or path for the signal may include other hierarchical data (e.g., prefixes and/or suffixes) surrounding the term "ap_idle" so that hardware compiler 215 is capable of determining a match between the signals of signal database 305 and signals within metadata 320 despite the signals not matching identically. For example, in this case hardware compiler 215 is capable of matching the formative or term "ap_idle". As such, hardware compiler 215 is capable of matching or locating the "ap_idle" signal for each of kernels 140, for each compute unit in each kernel, and/or for each function in each compute unit from metadata 320 and including the signals from metadata 320 within kernel trace configuration 330.

Kernel trace configuration 330 is provided to kernel trace viewer 245 and configures the view that is displayed by kernel trace viewer 245. Kernel trace configuration 330, for example, is a file that specifies a baseline configuration that is presented to the user by kernel trace viewer 245. Kernel trace configuration 330 specifies those signals of greater significance for the hardware accelerated kernels. In general, kernel trace configuration 330 specifies the signals and transactions shown in kernel trace viewer 245 for kernels, compute units, functions, and/or ports of circuit design 315. Kernel trace viewer 245 is also capable of specifying instructions specifying the way in which the data is to be shown, at least initially, by kernel trace viewer 245. It should be appreciated that a user may add or remove signals to the view presented by kernel trace viewer 245 once viewing of the signals has commenced.

Hardware emulator 325 is capable of emulating operation of a programmable IC with circuit design 315 implemented therein. In one or more embodiments, hardware emulator 325 is implemented as a hardware description language simulator. Hardware emulator 325 is capable of generating kernel trace data 235 from performing emulation. Kernel trace data 235 includes the time varying values of signals, e.g., each signal, of circuit design 315 for the duration of the emulation. The kernel trace data 235 may be specified on a per-clock cycle basis in reference to the target IC for circuit design 315.

Kernel trace viewer 245 is capable of determining operational data from kernel trace data 235 and displaying the operational data. For example, kernel trace viewer 245 is capable of filtering kernel trace data 235 to extract operational data and display such data. Kernel trace viewer 245 is capable of filtering kernel trace data 235 to extract or determine the particular operational data specified by kernel trace configuration 330 for display through a user interface generated by kernel trace viewer 245. Kernel trace data 235, for example, may include more signals and more data than may be displayed or is desirable to display via kernel trace viewer 245. Kernel trace viewer 245 determines the signals and data to be displayed and the formatting of such data from kernel trace configuration 330.

In the example of FIG. 3, kernel trace configuration 330 is generated at compile time. One benefit of the compiler-generated methodology illustrated in FIG. 3 is that the process need only be performed one time and trace viewing can be run as many times as desired. For example, kernel trace data 235 and kernel trace configuration 330 may be stored in non-volatile memory and remain available for one or more emulations of the hardware.

Figure 4:
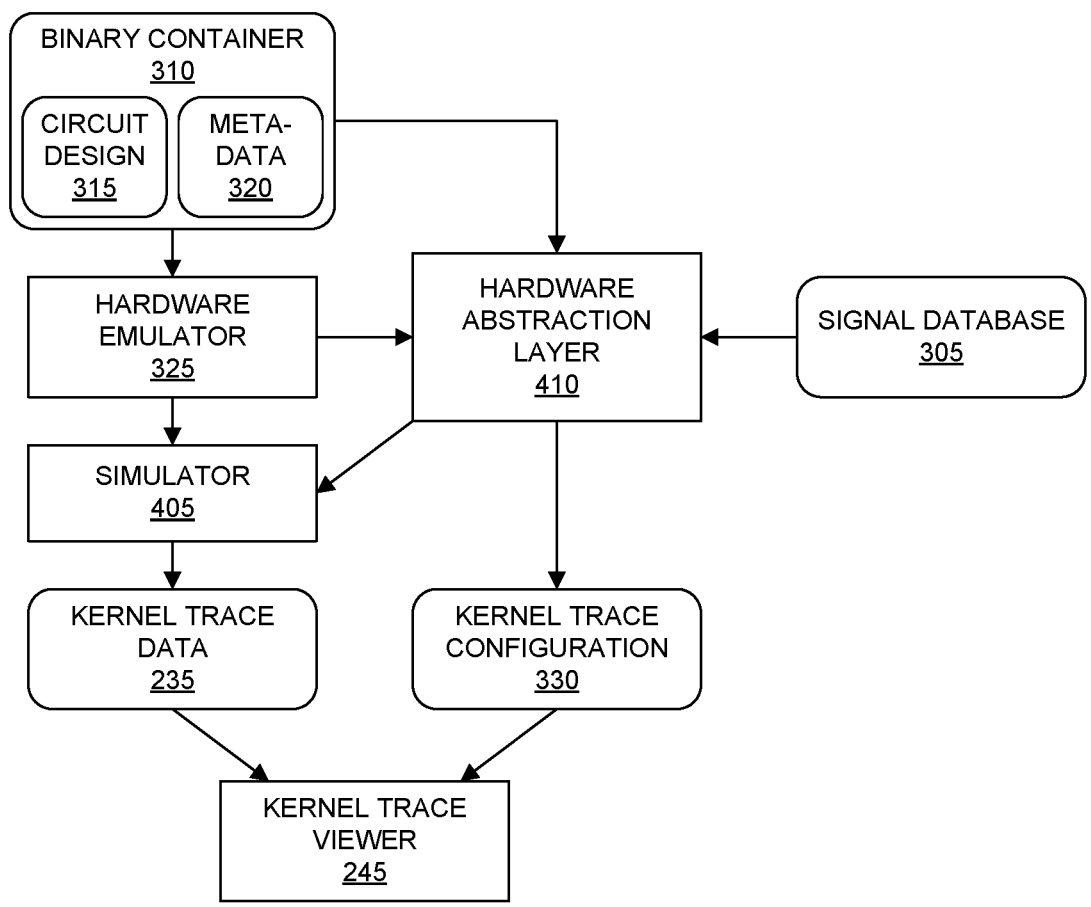
FIG. 4 illustrates another example method of generating trace data.

FIG. 4 illustrates another example method of generating trace data. In the example of FIG. 4, kernel trace configuration 330 is generated at runtime, e.g., during emulation of circuit design 315. In the example of FIG. 4, hardware emulator 325 interacts with a hardware abstraction layer (HAL) 410. In one or more embodiments, hardware emulator 325 is implemented as a hardware description language simulator. HAL 410 is software that is operational at runtime. HAL 410 is capable of operating at runtime during hardware emulation or during runtime of an operational system where circuit design 315 is implemented in a programmable IC. For example, HAL 410 is capable of communicating directly with a programmable IC in which circuit design 315 is implemented and directly with the kernels implemented therein as hardware. In the case of hardware emulation, HAL 410 is capable of communicating with hardware emulator 325, which may be treated by HAL 410 as a proxy for the programmable IC and/or hardware accelerated kernels. HAL 410 is further capable of communicating with simulator 405.

HAL 410 and/or hardware emulator 325 are capable of invoking simulator 405. Simulator 405 is capable of simulating execution of compiled host program code. Simulator 405 is capable of interacting with hardware emulator 325, which emulates operation of the programmable IC and circuit design 315. For example, hardware emulator 325 and simulator 405 are capable of interacting to emulate operation and communication of a host and hardware accelerated kernels of the HCP.

In particular embodiments, HAL 410 is capable of accessing metadata 320 and signal database 305 as previously described in connection with hardware compiler 215 of FIG. 3 to generate kernel trace configuration 330. As discussed, kernel trace viewer 245 uses, e.g., is configured by, kernel trace configuration 330. Because kernel trace configuration 330 is generated at runtime, e.g., "on the fly," the generation of kernel trace data 235 and operation of kernel trace viewer 245 requires reduced disk space. For example, kernel trace configuration 330 may be stored in volatile memory as opposed to non-volatile memory.

Figure 5A:
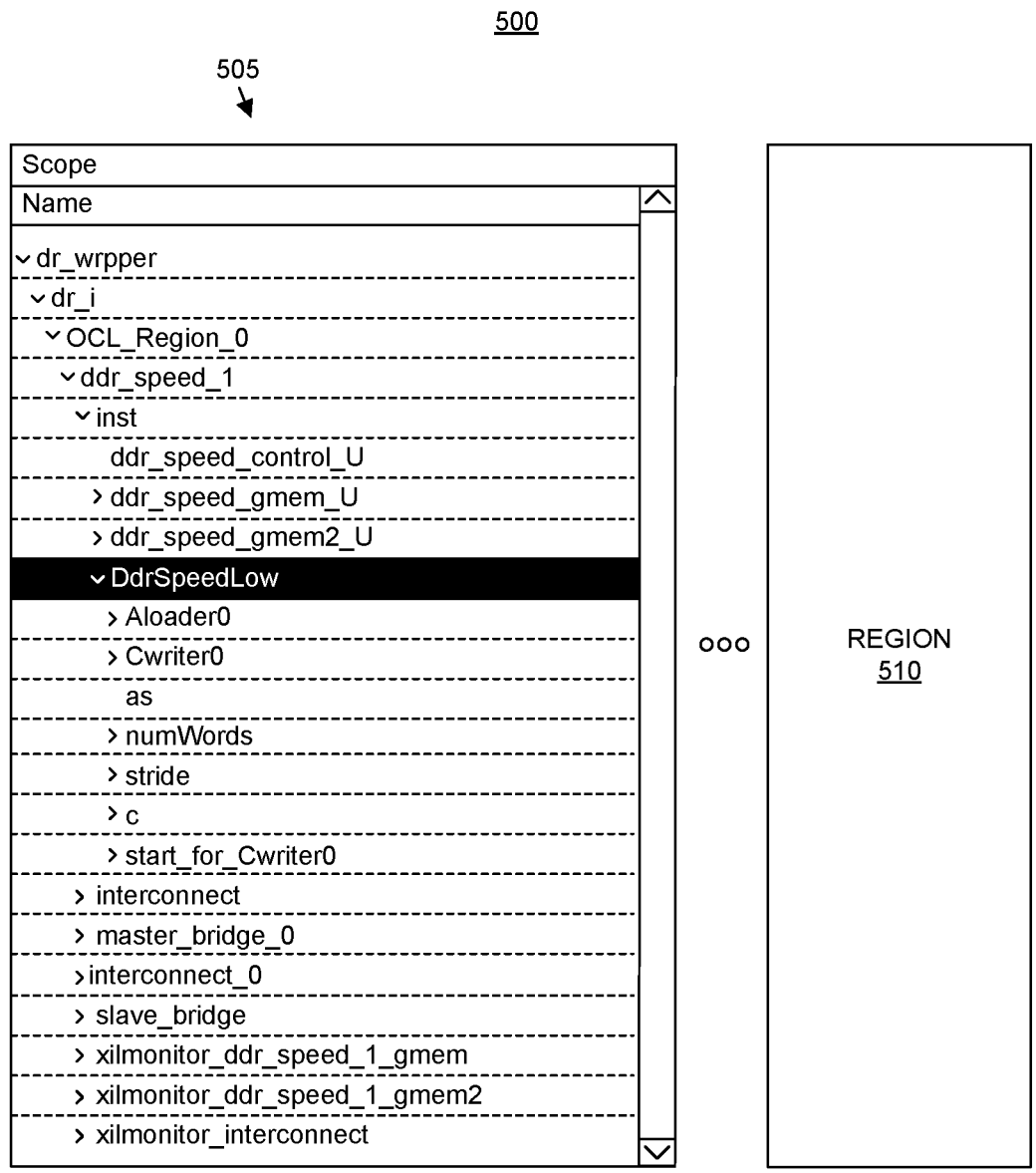

FIGS. 5A and 5B, taken collectively, illustrate an example user interface 500 for displaying trace data generated through hardware emulation. In the example of FIG. 5, user interface 500 is a graphical user interface generated by kernel trace viewer 245. Kernel trace viewer 245 is capable of generating user interface 500 based upon kernel trace configuration 330. Kernel trace configuration 330, for example, specifies a list of the particular signals, transactions, and hardware elements from the emulated hardware (e.g., circuit design 315) that are to be displayed, at least initially, in user interface 500. Kernel trace viewer 245 is capable of generating user interface 500 using portions of kernel trace data 235 as specified by kernel trace configuration 330.

In one or more embodiments, kernel trace data 235 includes trace data for more signals than may be displayed using kernel trace viewer 245. In particular embodiments, kernel trace data 235 includes time series data for each signal of the circuit design for the time period of the hardware emulation. Accordingly, kernel trace viewer 245 accesses the portions of kernel trace data 235 needed to generate user interface 500 based upon the particular signals, transactions, and/or circuit blocks of circuit design 315 specified in kernel trace configuration 330.

In the example of FIG. 5, user interface 500 includes regions 505 and 510. Referring to FIG. 5A, region 505 of user interface 500 specifies the scope of circuit design 315. For example, region 505 displays a hierarchical tree view in which individual nodes can be expanded. Region 505 illustrates that circuit design 315 includes an OpenCL region "0" indicated by "OpenCL_Region_0" that is implemented in the programmable IC. Within "OpenCL_Region_0", a kernel called "ddr_speed" is implemented. Region 505 further lists other circuit objects included in the "ddr_speed" kernel including circuit implementations of functions such as "Aloader" and "Cwriter".

Referring to FIG. 5B and region 510, user interface 500 is capable of displaying operational data such as signals and buses in a uniform hierarchy specific to a particular HCP (e.g., the host and devices). In the example of FIG. 5B, region 510 displays a hierarchical tree view in which individual nodes can be expanded. Each device, in this case a programmable IC, in the system is shown along with each binary container implemented within that device. Row 515 specifies the device.

Rows 520 represent data at the binary container level. For example, rows 520 represent data transfers for the entire binary container or OpenCL region implemented within the programmable IC (e.g., reads and/or writes performed by each kernel of the binary container that is emulated and intended to be implemented within the programmable IC at the same time). In the example of FIG. 5B, rows 520 illustrate data transfers such as "Read Address", "Read Data", "Write Address", and "Write Data". The waveform view column illustrates transaction activity for each of "Read Address", "Read Data", "Write Address", and "Write Data". The waveforms illustrated for "Read Address", "Read Data", "Write Address", and "Write Data" may be generated by kernel trace viewer 245 by processing multiple lower level signals to present a transactional view as opposed to the individual low-level signals that implement the transactions.

Within the binary container "binary_container_1", each kernel is broken down into the constituent compute units. Each compute unit is broken down into the constituent functions. This level of detail is shown in FIG. 5B with reference to row 525 specifying kernel "ddr_speed" and row 530 corresponding to the compute unit "ddr_speed_1" within kernel "ddr_speed". Rows 535 illustrate different signals for compute unit "ddr_speed_1".

In the example of FIG. 5B, not all of the functions included in kernel "ddr_speed" are shown. For example, scrolling the view shown in region 510 down would reveal further information such as ports for the function "DdrSpeedLow" such as "a" which is an AXI interface per the metadata of Listing 2, "numWords" which is a FIFO interface, "stride" which is another FIFO interface, and "as" which is another FIFO interface.

In one or more embodiments, the waveform view is capable of displaying whether a given kernel, compute unit, and/or function is running. For example, the waveform viewer is capable of highlighting or showing a waveform indicating that the entity is running based upon when the corresponding "ap_idle" signal is zero at different times throughout the emulation.

FIG. 6 illustrates another example user interface 600 for displaying trace data generated through hardware emulation. User interface 600 illustrates a hierarchical breakdown of the binary container and operational data for the kernels, compute units, functions, and ports of the circuit design as presented using kernel trace viewer 245.

In the example of FIG. 6, user interface 600 shows a busy/idle summary of interface channels. In this example, the interface channels are AMBA eXtensible Interface (AXI) buses. An AMBA AXI bus is an embedded microcontroller bus interface for use in establishing on-chip connections between circuit blocks and/or systems. The AXI channels include "Read Address", "Read Data", "Write Address", and "Write Data". In addition, in response to selecting a particular portion of the waveform shown in the waveform view, a tool tip 605 is shown. Tool tip 605 shows more detailed information from the trace data for the selected portion of the waveform selected by the user. While AXI buses are used for purposes of illustration, it should be appreciated that the inventive arrangements are not intended to be limited to the particular type of bus and/or interface used. Other example interface implementations may include, but are not limited to, buses, cross-bars, and network on chips (NoCs).

In one or more embodiments, kernel trace viewer 245 is capable of translating the trace signals into simplified "busy" or "idle" signal representations. For example, kernel trace viewer 245 is capable of identifying starts and ends of individual transactions (e.g., reads and/or writes) occurring on a bus or port and representing the transaction as a single, unified bar in the waveform view as opposed to the multiple low-level signals analyzed to determine the transactions. More detailed information such as burst length, burst size, burst type, cache type, and the like may be stored and displayed in response to a user request to do so. For example, kernel trace viewer 245 is capable of providing the more detailed information as pictured in FIG. 6 as tool tip 605.

User interface 600, as generated by kernel trace viewer 245, is also capable of displaying information such as the number of values currently in every intra-kernel stream and inter-kernel pipe. The number of values currently in every intra-kernel stream and/or inter-kernel pipe indicates relative timing between the circuits that produce data (producers) and the circuits that receive and consume data (consumers) generated by the producers.

In the examples of FIGS. 5 and 6, further information can be displayed on a per compute-unit basis such as compute unit stalls (CU Stalls), data transfers, and the status of user functions within the compute units (e.g., "DdrSpeedLow" in FIG. 5B).

FIGS. 5 and 6 are presented for purposes of illustration and not limitation. The particular arrangement of the user interface generated by kernel trace viewer 245 and the use of particular interface elements such as tool tips is not intended to be limiting of the embodiments described. Kernel trace viewer 245, for example, is capable of presenting or displaying the information illustrated in FIGS. 5 and 6 using other suitable user interfaces.

Figure 7:
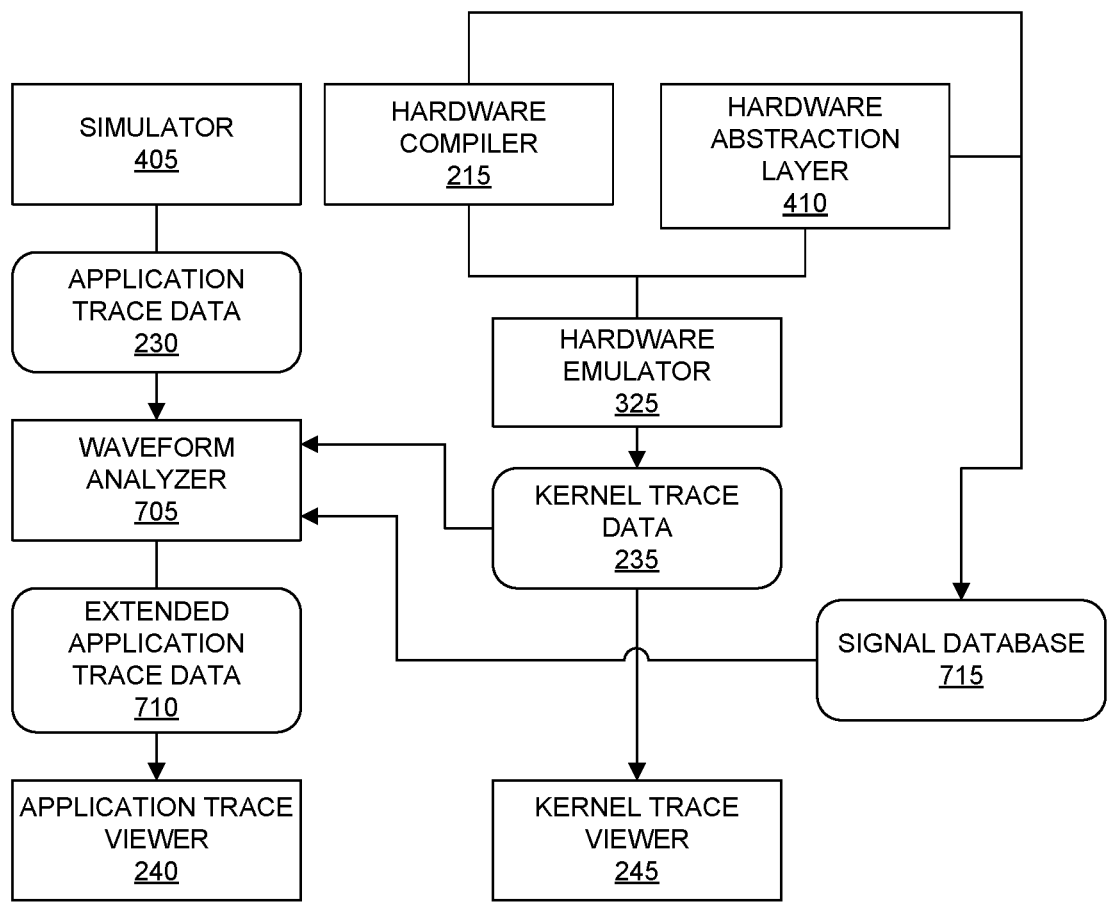
FIG. 7 illustrates another example method of generating trace data.

FIG. 7 illustrates another example method of generating trace data. The operations illustrated in FIG. 7 may be performed by a system the same as, or similar to, the system described in connection with FIG. 1. In the example of FIG. 7, kernel trace data 235 and application trace data 230 may be superimposed together within a single view.

In the example of FIG. 7, a waveform analyzer 705 is included. Waveform analyzer 705 is capable of receiving application trace data 230, kernel trace data 235, and further accesses signal database 715. Signal database 715 specifies the particular signals to be extracted from kernel trace data 235 for inclusion in extended application trace data 710. Waveform analyzer 705 is capable of combining selected portions of kernel trace data 235, as specified by signal database 715, with application trace data 235 to generate extended application trace data 710. For example, waveform analyzer 705 is capable of extracting those portions of kernel trace data 235 as specified by signal database 715 and combining the selected portions of kernel trace data 235 with application trace data 230. Waveform analyzer 705 is capable of outputting the combination of application trace data 230 and selected portions of kernel trace data 235 to generate extended application trace data 710.

Application trace viewer 240 is capable of generating a visualization of extended application trace data 710. The visualization may be a waveform view or a summary. In each case, the selected portions of kernel trace data 235 are combined or intermingled with application trace data 230. For example, in the case of a waveform view, application trace viewer 240 is capable of displaying waveforms from extended application trace data including signals from both application trace data and kernel trace data 235 in a single or common timeline.

Figure 8:
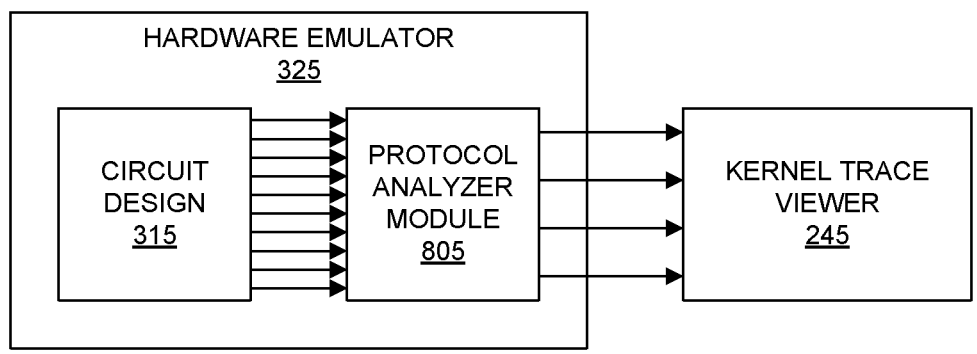
FIG. 8 illustrates another example of generating trace data.

FIG. 8 illustrates another example of generating trace data. In the example of FIG. 8, hardware compiler 215 is capable of compiling kernels 140 into circuit design 315. In addition, hardware compiler 215 is capable of coupling circuit design 315 with further hardware description language and/or RTL (e.g., a hardware description language module or core) referred to as a protocol analyzer 805. Hardware compiler 215 is capable of coupling signals of a user selected interface of circuit design 315 to protocol analyzer 805. As such, the combination of circuit design 315 and protocol analyzer 805 is emulated using hardware emulator 325.

Protocol analyzer 805 is capable of processing signals received from one or more interfaces of circuit design 315 (e.g., an interface between two circuit blocks) and outputting processed transactional data to kernel trace viewer 245. In one or more embodiments, the interface is an on-chip interconnect. An example of an on-chip interconnect is AXI bus. For example, each of two circuit blocks may have one or more AXI-compliant ports wired together forming an interface to which protocol analyzer 805 may be connected. AXI is provided as an illustrative example of an interface and is not intended as a limitation of the embodiments described within this disclosure. Other examples of interface 220 include, but are not limited to, other types of buses, a network-on-chip (NoC), a cross-bar, or other type of switch.

In one or more embodiments, protocol analyzer 805 is capable of performing signal processing operations on individual signals of circuit design 315 and translating the individual (e.g., low-level) signals of circuit design 315, e.g., for an interface, into higher level transactional data that is output either directly to kernel trace viewer 245 or stored in a file that is read by kernel trace viewer 245. As such, kernel trace viewer 245 need not process individual signals to represent read or write transactions. Instead, protocol analyzer 805 detects read and write transactions and outputs the transactions directly to kernel trace viewer 245 as transaction waveforms. Kernel trace viewer 245 need not perform signal analysis, but rather can display transactional data generated by protocol analyzer 805.

As an illustrative and non-limiting example, protocol analyzer 805 is capable of identifying starts and corresponding ends of individual transactions (e.g., reads and/or writes) occurring on a bus or port by processing the individual signals received from circuit design 315 for the bus or port and representing the transaction as a single, unified entity such as a bar or waveform in the waveform view as illustrated in rows 520 of FIG. 5B. In another example, protocol analyzer 805 is capable of analyzing a plurality of signals for a kernel at the compute unit level, the function level, and/or the port level to generate a busy/idle signal for the kernel, for compute units within the kernel, for functions within each compute unit, and/or for ports.

The technique illustrated in FIG. 8 allows multiple different cores to be developed where each core is specialized or tailored for analyzing signals of a particular interface. The cores can be inserted or included in the hardware emulation as needed depending upon the particular interfaces used in circuit design 315. By including protocol analyzer modules as cores, protocol analyzer functionality for kernel trace viewer 245 need not be developed for each different type of interface desired. In many cases, development of a hardware description language protocol analyzer module can be accomplished more efficiently than is the case with developing similar protocol analyzer functionality within an electronic design automation tool in a high-level programming language.

In one or more embodiments, one or more protocol analyzers as described in connection with FIG. 8 can be used with a user circuit design to generate and/or provide trace data, e.g., higher level transactional data, to kernel trace viewer 245. In one or more other embodiments, kernel trace viewer 245 is programmed to process signals to generate the higher level transactional data and/or busy/idle waveforms. In particular embodiments, kernel trace viewer 245 can operate as described and be used in coordination with one or more hardware description language protocol analyzers.

Figure 9:
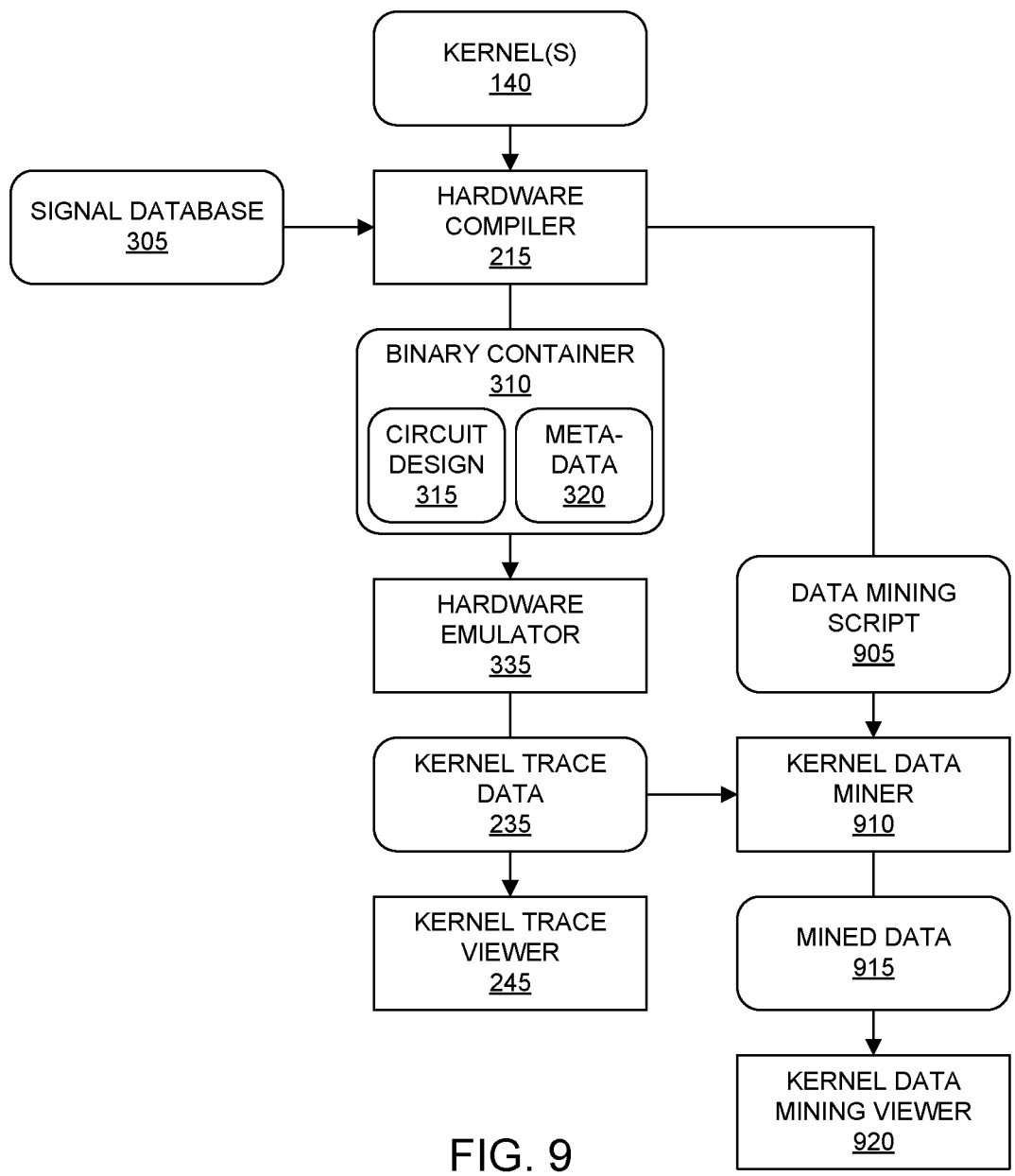
FIG. 9 illustrates an example method of data mining kernel trace data.

FIG. 9 illustrates an example method of data mining kernel trace data 235. In the example of FIG. 9, a data mining script is generated at compile time that is used to data mine kernel trace data 235. Hardware compiler 215 is capable of compiling kernels 140 to generate binary container 310 as previously described. Hardware compiler 215 is also capable of generating data mining script 905. Data mining script 905 is used, e.g., executed, to extract particular data of interest from kernel trace data 235.

For example, hardware compiler 215 is capable of accessing signal database 305. Hardware compiler 215 is also capable of accessing metadata 320, once generated. Based upon signal database 305 and metadata 320, hardware compiler 215 is capable of identifying the objects and signals of interest within circuit design 315. Hardware compiler 215 is capable of automatically generating data mining script 905. Data mining script 905 is executable to extract particular portions of kernel trace data 235 and perform various computations to be described herein in greater detail in connection with FIG. 11.

As an illustrative and non-limiting example, metadata 320 within binary container 310 specifies information such as kernel names, compute unit names, functions names, port names, and signal names. Hardware compiler 215 utilizes this information by matching such information from metadata 320 with items in signal database 305. Hardware compiler generates data mining script 905 to extract the signals of interest.

Kernel data miner 910 is capable of receiving data mining script 905 and executing data mining script 905 to process kernel trace data 235. Kernel data miner 910, in executing data mining script 905, extracts the particular portions of kernel trace data 235 of interest and optionally performs calculations on the extracted data as specified by data mining script 905 to generate mined data 915. Kernel data mining viewer 920 is capable of generating a user interface and presenting mined data 915 through the user interface. An example of a user interface generated by kernel data mining viewer 920 is described in connection with FIG. 11.

Figure 10:
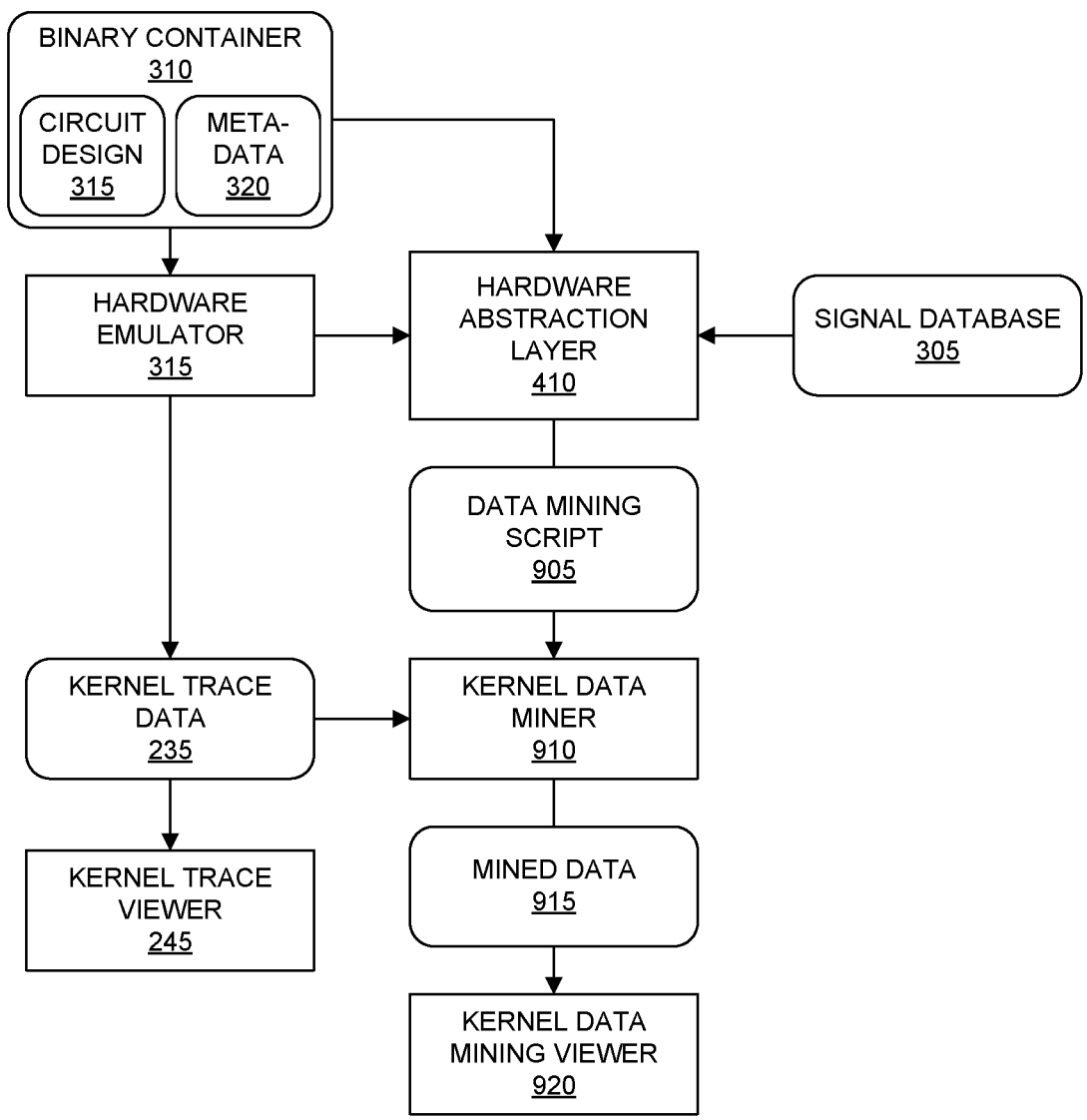
FIG. 10 illustrates another example of data mining kernel trace data.

FIG. 10 illustrates another example of data mining kernel trace data 235. In the example of FIG. 10, data mining script 905 generated at runtime (e.g., during hardware emulation) and is used to data mine kernel trace data 235. In the example of FIG. 10, binary container 310 is already generated and emulation of circuit design 315 begins.

HAL 410 is capable of accessing signal database 305. HAL 410 is also capable of accessing metadata 320 and interacting with hardware emulator 325 to provide support for hardware-level communication (e.g., for emulator 325). Based upon signal database 305, metadata 320, and interaction with hardware emulator 325, HAL 410 is capable of identifying the objects and signals of interest within circuit design 315. HAL 410 is capable of automatically generating data mining script 905. Data mining script 905 is executable to extract particular portions of kernel trace data 235 and perform various computations to be described herein in greater detail in connection with FIG. 11. HAL 410 is capable of generating data mining script 905 substantially as described with reference to hardware compiler 215 of FIG. 9.

Kernel data miner 910 is capable of receiving data mining script 905. Kernel data miner 910 is capable of executing data mining script 905 to process kernel trace data 235. Kernel data miner 910, in executing data mining script 905, extracts the particular portions of kernel trace data 235 of interest and optionally performs calculations on the extracted data as specified by data mining script 905 to generate mined data 915. Kernel data mining viewer 920 is capable of generating a user interface and presenting mined data 915 through the user interface. An example of a user interface generated by kernel data mining viewer 920 is described in connection with FIG. 11.

Referring to both FIGS. 9 and 10, in one or more embodiments, kernel data miner 910 is operative following a run of hardware emulator 325. In particular embodiments, kernel data miner 910 is operable during a run of hardware emulator 325. Mined data 915 can be viewed through kernel data mining viewer 920 on a timeline as running values, in a summary table as running values, or summarized at the end of a run of hardware emulator 325.

Listing 4 shows a portion of an example data mining script. For purposes of illustration the example program code shown in Listing 4 is formatted using Tcl. It should be appreciated that the data mining script can be generated using any of a variety of different scripting languages. As such, the particular scripting language used is not intended as a limitation of the embodiments described. In particular embodiments, either HAL 410 or hardware compiler 215 is capable of generating source code that can be compiled into a binary file, e.g., an executable. In such embodiments, the executable replaces the data mining script and can be executed directly on the kernel trace data 235. In that case, kernel data miner 910 is not required.

Listing 4

```
# Get total time of a signal at a specified value
proc getTimeUsec {signal targetValue} {
    if {[get_objects -quiet $signal]=={ }} {
        return 0
    }
    set tranx [get_transitions $signal -start 0 -end [getEndTime] ]
    set otherValue [expr 1–$targetValue]
    set startTime 0
    set totalTimeUsec 0
    for {set i 0} {$i<[llength $tranx] } {incr i} {
        set tr [lindex $tranx $i]
        set currTime [lindex $tr 0]
        set currUnit [lindex $tr 1]
        set currValue [lindex $tr 2]
        if {$currValue==$targetValue} {
            set startTime $currTime
        } elseif {$currValue==$otherValue && $startTime >0}
        {
            set factor 6.0
            if {[string first ns $currUnit]==0} {set factor 3.0}
            set totalTimeUsec [expr $totalTimeUsec+(($currTime–$startTime)/pow(10.0, $factor))]
            set startTime 0
        }
    }
    return $totalTimeUsec
}
```

The example code of Listing 4 is a function that takes a signal name as input and a target value (e.g., "0" or "1") and calculates the total time (in μsec) that the given signal is equal to the target value for the entire run of the emulation or simulation as the case may be. The function "get_transitions" mines the kernel trace data and returns an array of all transitions for the specified signal within the time window provided. The function "getEndTime" returns the end time of the entire simulation. In particular embodiments, the data mining script can be provided with a specified time window. Once the desired hierarchical signal names (and corresponding target values) within a design are identified using metadata 320 and signal database 305, the example program code of Listing 4 can be called as a script or in executable form.

FIGS. 11A and 11B, taken collectively, illustrate an example user interface 1100 showing data mining results. In the example of FIG. 11, user interface 1100 displays data mining results, e.g., operational data, in summary form using tables. Kernel trace data 235 is processed using data mining script 905 or an executable to obtain the information shown in user interface 1100. For example, data including, but not limited to, total running times, stall times, percent of total time spent on transactions, and other data is displayed for the kernels, for each compute unit within each kernel, for each function within each compute unit, and for each port of each compute unit.

In the example of FIG. 11, the calculations performed through execution of data mining script 905 and/or an executable are described with reference to a particular kernel, a particular compute unit, a particular function, and a particular port. It should be appreciated that such computations can be performed for one or more selected kernels or each kernel, one or more selected compute units or each compute unit, one or more selected functions or each function, and/or one or more selected ports or each port based upon the hierarchy of the circuit design. In particular, the computations are performed for those kernels, compute units, functions, and ports that are specified within the data mining script or executable. In the example of FIG. 11, the kernel "ddr_speed" and the compute unit "ddr_speed_1" within the kernel "ddr_speed" are used for purposes of illustration.

Referring to the table beneath the heading "Compute Units: Running Time and Stalls" in FIG. 11A, data mining script 905 is capable of calculating the running time of the compute unit "ddr_speed_1" as the total amount of time during the hardware emulation run that the signal "ap_idle" for the compute unit "ddr_speed_1" is equal to zero. Data mining script 905 is capable of calculating intra-kernel stream stall (%) as the percentage of the total time of the hardware emulation run that the signal "ap_int_blocking_n" for the compute unit "ddr_speed_1" is equal to zero while the compute unit ("ddr_speed_1") is running. Data mining script 905 is capable of calculating external memory stalls (%) as the percentage of the total time of the hardware emulation run that the signal "ap_ext_blocking_n" of the computer unit "ddr_speed_1" is equal to zero while the compute unit is running. Data mining script 905 is capable of calculating inter-kernel pipe stalls (%) as the percentage of the total time of the hardware emulation run that the signal "ap_str_blocking_n" of the compute unit "ddr_speed_1" is equal to zero for the compute while the compute unit is running.

Referring to the table beneath the heading "Functions: Running Time and Stalls" in FIG. 11A, data mining script 905 is capable of calculating quantities for each function of compute unit "ddr_speed_1". For purposes of description, only calculation of quantities for the function "DdrSpeedLow" is shown. Data mining script 905 is capable of calculating running time for the function "DdrSpeedLow" as the total amount of time during the hardware emulation run that the signal "ap_idle" for the function "DdrSpeedLow" is equal to zero. Data mining script 905 is capable of calculating intra-kernel stream stall (%) as the percentage of the total time of the hardware emulation run that the signal "ap_int_blocking" for the function "DdrSpeedLow" is equal to zero while the compute unit ("ddr_speed") is running. Data mining script 905 is capable of calculating external memory stalls (%) as the percentage of the total time of the hardware emulation run that the signal "ap_ext_blocking_n" for the function "DdrSpeedLow" is equal to zero while the compute unit is running. Data mining script 905 is capable of calculating inter-kernel pipe stalls (%) as the percentage of the total time of the hardware emulation run that the signal "ap_str_blocking_n" of the function "DdrSpeedLow" is equal to zero for the compute while the compute unit is running.

Referring to the table beneath the heading "Compute Unit: Port Data Transfer" in FIG. 11A, data mining script 905 is capable of calculating the quantities shown for each port of the compute units. For purposes of description, only the calculation of quantities for the port "m_axi_gmem" is shown. Data mining script 905 is capable of calculating write time for the port "m_axi_gmem" as the total amount of outstanding write time greater than zero. The total outstanding write time refers to the total amount of time that write transactions are being performed during the hardware emulation run for the port. Data mining script 905 is capable of calculating outstanding write time by dividing the write time by the total time the compute unit is running during the hardware emulation run. Data mining script 905 is capable of calculating read time for the port "m_axi_gmem" as the total amount of outstanding read time greater than zero. The total outstanding read time refers to the total amount of time that read transactions are being performed during the hardware emulation run for the port. Data mining script 905 is capable of calculating outstanding read time by dividing the read time by the total time the compute unit is running during the hardware emulation run.

Referring to the table beneath the heading "Functions: Port Data Transfer" in FIG. 11B, data mining script 905 is capable of calculating the quantities shown for each port of the function of the compute unit(s) shown. For purposes of description, only the calculation of quantities for ports "a" and "c" are shown. Data mining script 905 is capable of calculating write time for port "c" as the total amount of outstanding write time greater than zero. The total outstanding write time refers to the total amount of time that write transactions are being performed on the port during the hardware emulation run. Data mining script 905 is capable of calculating outstanding write time by dividing the write time of the port by the total time the compute unit is running during the hardware emulation run. Data mining script 905 is capable of calculating read time for the port "a" as the total amount of outstanding read time greater than zero. The total outstanding read time refers to the total amount of time that read transactions are being performed on the port during the hardware emulation run for the port. Data mining script 905 is capable of calculating outstanding read time by dividing the read time for the port by the total time the compute unit is running during the hardware emulation run.

Referring to the table beneath the heading "Functions: Loop Activity" in FIG. 11, data mining script 905 is capable of calculating the quantities shown for each of the loop(s) of the functions and compute unit shown. For purposes of description, only the calculation of quantities for the loop "0" and "1" are shown. Data mining script 905 is capable of calculating running time for the loops "0" and "1" by calculating the amount of time the activity signal is greater than or equal to one during the hardware emulation run for each loop. Data mining script 905 is capable of calculating the running utilization as the running time divided by the running time of the compute unit in which the loop is implemented during the hardware emulation run.

FIG. 11 illustrates that compiler specific information is utilized in particular ones of the calculations. For example, the state of compiler generated signals during the hardware emulation run is utilized to determine quantities such as running time and stalls. Signal database 305 may list "ap_idle" for the idle signal and indicate that the "ap_idle" signal is to be extracted or processed for each level of the circuit design hierarchy (e.g., kernel, compute unit, function, and/or port). Similarly, signal database 305 may specify the particular signal or signals to be processed that indicate stall conditions for the different levels of the circuit design hierarchy. The hardware compiler or HAL is capable of generating the data mining script to extract the "ap_idle" signal and/or any other signals of interest specified in signal database 305 and process the corresponding trace data for the signal(s) (e.g., the time value series for each signal for the hardware emulation) to calculate the quantities described on a per kernel, per compute unit, per function, and/or per port basis.

Figure 12:
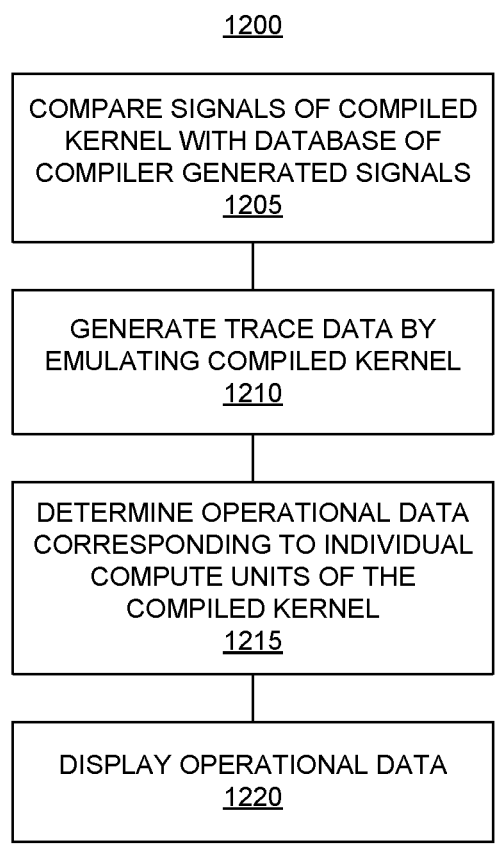
FIG. 12 illustrates an example method of tracing operation of a kernel designated for hardware acceleration.

FIG. 12 illustrates an example method 1200 of tracing operation of a kernel designated for hardware acceleration. Method 1200 may be implemented by a data processing system, e.g., one or more data processing systems, as described herein in connection with FIG. 1. Method 1200 may begin in a state where the kernel to be hardware accelerated has been compiled.

In block 1205, the system is capable of comparing signals of the compiled kernel with a database specifying compiler generated signals. By the comparing, the system determines a list of the signals of the compiled kernel that match the compiler generated signals. As an illustrative and non-limiting example, the list of signals may be implemented as kernel trace configuration 330. As such, the list may be specified as a file, a database, or using another suitable data structure. The list of signals may be determined at compile time as described in connection with FIG. 3 or at runtime of the emulation as described in connection with FIG. 4.

In block 1210, the system is capable of generating trace data by emulating the compiled kernel. For example, the system is capable of emulating the compiled kernel as described herein in connection with FIGS. 2, 3, 4, 7, 8, 9, and/or 10. The trace data includes values for signals of the compiled kernel, inclusive of the signals of the list, collected over time during the emulation.

In block 1215, the system is capable of determining operational data corresponding to individual compute units of the compiled kernel. For example, the system is capable of determining any of the data described herein in connection with FIGS. 5 and/or 6. The system is also capable of determining any of the data described herein in connection with FIG. 11.

In block 1220, the system is capable of displaying the operational data. For example, the system is capable of displaying the operational data using a waveform view as described in connection with FIGS. 5 and/or 6. In another example, the system is capable of displaying the operational data a summary view as described herein in connection with FIG. 11.

Figure 13:
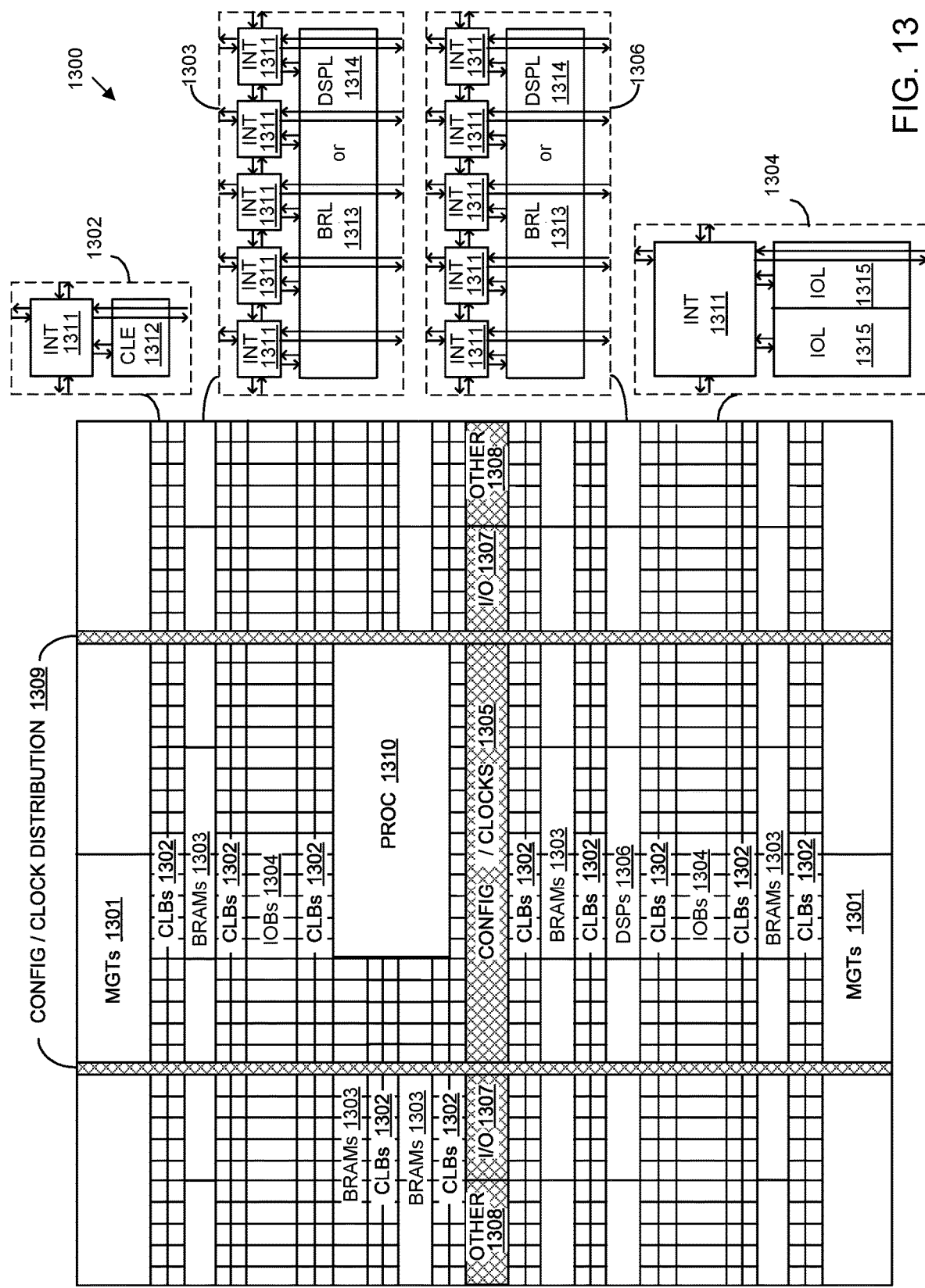
FIG. 13 illustrates an example architecture for an integrated circuit.

FIG. 13 illustrates an example architecture 1300 for an IC. In one aspect, architecture 1300 may be implemented within a programmable IC. For example, architecture 1300 may be used to implement a field programmable gate array (FPGA). Architecture 1300 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1300 includes several different types of programmable circuit, e.g., logic, blocks. For example, architecture 1300 may include a large number of different programmable tiles including multi-gigabit transceivers (MGTs) 1301, configurable logic blocks (CLBs) 1302, random access memory blocks (BRAMs) 1303, input/output blocks (IOBs) 1304, configuration and clocking logic (CONFIG/CLOCKS) 1305, digital signal processing blocks (DSPs) 1306, specialized I/O blocks 1307 (e.g., configuration ports and clock ports), and other programmable logic 1308 such as digital clock managers, analog-to-digital converters, system monitoring logic, and so forth.

In some ICs, each programmable tile includes a programmable interconnect element (INT) 1311 having standardized connections to and from a corresponding INT 1311 in each adjacent tile. Therefore, INTs 1311, taken together, implement the programmable interconnect structure for the illustrated IC. Each INT 1311 also includes the connections to and from the programmable logic element within the same tile, as shown by the examples included at the top of FIG. 13.

For example, a CLB 1302 may include a configurable logic element (CLE) 1312 that may be programmed to implement user logic plus a single INT 1311. A BRAM 1303 may include a BRAM logic element (BRL) 1313 in addition to one or more INTs 1311. Typically, the number of INTs 1311 included in a tile depends on the height of the tile. As pictured, a BRAM tile has the same height as five CLBs, but other numbers (e.g., four) also may be used. A DSP tile 1306 may include a DSP logic element (DSPL) 1314 in addition to an appropriate number of INTs 1311. An IOB 1304 may include, for example, two instances of an I/O logic element (IOL) 1315 in addition to one instance of an INT 1311. The actual I/O pads connected to IOL 1315 may not be confined to the area of IOL 1315.

In the example pictured in FIG. 13, a columnar area near the center of the die, e.g., formed of regions 1305, 1307, and 1308, may be used for configuration, clock, and other control logic. Horizontal areas 1309 extending from this column may be used to distribute the clocks and configuration signals across the breadth of the programmable IC.

Some ICs utilizing the architecture illustrated in FIG. 13 include additional logic blocks that disrupt the regular columnar structure making up a large part of the IC. The additional logic blocks may be programmable blocks and/or dedicated circuitry. For example, a processor block depicted as PROC 1310 spans several columns of CLBs and BRAMs.

In one aspect, PROC 1310 may be implemented as dedicated circuitry, e.g., as a hardwired processor, that is fabricated as part of the die that implements the programmable circuitry of the IC. PROC 1310 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1310 may be omitted from architecture 1300 and replaced with one or more of the other varieties of the programmable blocks described. Further, such blocks may be utilized to form a "soft processor" in that the various blocks of programmable circuitry may be used to form a processor that can execute program code as is the case with PROC 1310.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 13 that are external to PROC 1310 such as CLBs 1302 and BRAMs 1303 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1310.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 1310 or a soft processor. In some cases, architecture 1300 includes a dedicated configuration processor that loads the configuration bitstream to the appropriate configuration memory and/or processor memory. The dedicated configuration processor does not execute user-specified program code. In other cases, architecture 1300 may utilize PROC 1310 to receive the configuration bitstream, load the configuration bitstream into appropriate configuration memory, and/or extract program code for execution.

FIG. 13 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 13 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1310 within the IC are for purposes of illustration only and are not intended as limitations.

In one or more embodiments, architecture 1300 is used as a device within an HCP to hardware accelerate one or more kernels. Within architecture 1300, a static region can be implemented that includes an interface (e.g., PCIe) to couple to the host, a memory controller to access an external RAM, and various other peripherals as may be required. The circuitry of the static region couples to the OpenCL region, which includes the physical circuit implementations that hardware accelerate the kernels. Using the various circuit blocks of the programmable circuitry, the static circuitry and the hardware accelerated kernels are implemented.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one (e.g., one or more) hardware circuit(s). The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller. Within the claims, reference to "a processor" may refer to one or more different processors of different computing systems.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods. The methods may be directed to tracing operation of a kernel. The kernel may be designated for hardware acceleration. In one aspect, a method can include comparing, using a processor, signals of a compiled kernel with a database specifying compiler generated signals for compute units to determine a list of the signals of the compiled kernel that match the compiler generated signals. The method can include generating trace data by emulating the compiled kernel using the processor, wherein the trace data includes values for signals of the compiled kernel collected over time during the emulation. The method can include determining, from values of the signals of the list within the trace data and using the processor, operational data corresponding to individual compute units of the compiled kernel. The method can also include displaying, using the processor, the operational data.

In an aspect, determining the operational data includes generating a summary of operational states of the individual compute units of the compiled kernel, wherein the operational states include running time and stall time.

In another aspect, determining the operational data includes generating a summary of operational states of individual functions of the individual compute units of the compiled kernel, wherein the operational states include loop activity.

In another aspect, determining the operational data includes generating a data mining script executable to generate a summary including at least one of operational states of the individual compute units of the compiled kernel or operational states of individual functions of the individual compute units of the compiled kernel.

In another aspect, displaying the operational data includes displaying a waveform view including the signals of the list hierarchically ordered based upon the individual compute units of the compiled kernel.

In another aspect, displaying the operational data includes displaying a waveform view including the signals of the list hierarchically ordered based upon the individual compute units of the compiled kernel and functions within the individual compute units.

In another aspect, displaying the operational data includes displaying a waveform view indicating operational states of at least one of individual compute units or individual functions of the individual compute units of the compiled kernel, wherein the operational states include running time and stall time.

One or more embodiments are directed to systems. The systems are capable of tracing operation of kernel. The kernel may be designated for hardware acceleration and/or be hardware accelerated. In one aspect, a system includes a memory configured to store program code and a processor coupled to the memory. The processor, in response to executing the program code, is configured to initiate operations. The operations include comparing signals of a compiled kernel with a database specifying compiler generated signals for compute units to determine a list of the signals of the compiled kernel that match the compiler generated signals. The operations can include generating trace data by emulating the compiled kernel. The trace data can include values for signals of the compiled kernel collected over time during the emulation. The operations can include determining, from values of the signals of the list within the trace data, operational data corresponding to individual compute units of the compiled kernel. The operations can also include displaying the operational data.

In an aspect, determining the operational data includes generating a summary of operational states of the individual compute units of the compiled kernel, wherein the operational states include running time and stall time.

In another aspect, determining the operational data includes generating a summary of operational states of individual functions of the individual compute units of the compiled kernel, wherein the operational states include loop activity.

In another aspect, determining the operational data includes generating a data mining script executable to generate a summary including at least one of operational states of the individual compute units of the compiled kernel or operational states of individual functions of the individual compute units of the compiled kernel.

In another aspect, displaying the operational data includes displaying a waveform view including the signals of the list hierarchically ordered based upon the individual compute units of the compiled kernel.

In another aspect, displaying the operational data includes displaying a waveform view including the signals of the list hierarchically ordered based upon the individual compute units of the compiled kernel and functions within the individual compute units.

In another aspect, displaying the operational data includes displaying a waveform view indicating operational states of at least one of individual compute units or individual functions of the individual compute units of the compiled kernel, wherein the operational states include running time and stall time.

One or more embodiments are directed to computer program products. The computer program products may be directed to tracing operation of a kernel. The kernel may be designated for hardware acceleration and/or be hardware accelerated. In one aspect, a computer program product includes a computer readable storage medium having program code stored thereon. The program code is executable by a processor to perform operations. The operations include comparing signals of a compiled kernel with a database specifying compiler generated signals for compute units to determine a list of the signals of the compiled kernel that match the compiler generated signals. The operations can include generating trace data by emulating the compiled kernel. The trace data can include values for signals of the compiled kernel collected over time during the emulation. The operations can include determining, from values of the signals of the list within the trace data, operational data corresponding to individual compute units of the compiled kernel. The operations can also include displaying the operational data.

In an aspect, determining the operational data includes generating a summary of operational states of the individual compute units of the compiled kernel, wherein the operational states include running time and stall time.

In another aspect, determining the operational data includes generating a summary of operational states of individual functions of the individual compute units of the compiled kernel, wherein the operational states include loop activity.

In another aspect, determining the operational data includes generating a data mining script executable to generate a summary including at least one of operational states of the individual compute units of the compiled kernel or operational states of individual functions of the individual compute units of the compiled kernel.

In another aspect, displaying the operational data includes displaying a waveform view including the signals of the list hierarchically ordered based upon the individual compute units of the compiled kernel.

In another aspect, displaying the operational data includes displaying a waveform view including the signals of the list hierarchically ordered based upon the individual compute units of the compiled kernel and functions within the individual compute units.

In another aspect, displaying the operational data includes displaying a waveform view indicating operational states of at least one of individual compute units or individual functions of the individual compute units of the compiled kernel, wherein the operational states include running time and stall time.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   compiling a kernel, specified in a high level programming language, into a circuit design for implementation in an integrated circuit, wherein the circuit design includes the compiled kernel connected to static circuitry having an interface configured to couple the compiled kernel to a host system and having a memory controller configured to couple the compiled kernel to a memory;
   generating metadata from the compiling, the metadata specifying a hierarchy of the kernel including a list of compute units of the kernel, functions of each compute unit, interfaces of the static circuitry to which the compiled kernel is coupled, and signals corresponding to the compute units and the functions;

comparing, using a processor, the signals of the compiled kernel from the metadata with a database specifying compiler generated signals for compute units and functions to determine a list of the signals of the compiled kernel connected to the static circuitry that match the compiler generated signals;

generating trace data by emulating the circuit design using the processor, wherein the trace data includes values for signals of the compiled kernel collected over time during the emulation;

determining, from values of the signals of the list within the trace data and using the processor, operational data corresponding to individual compute units and individual functions of the compiled kernel; and displaying, using the processor, the operational data correlated with the individual compute units and functions of the compiled kernel.

2. The method of claim 1, wherein the determining the operational data comprises:

generating a summary of operational states of the individual compute units of the compiled kernel, wherein the operational states include running time and stall time.

3. The method of claim 1, wherein the determining the operational data comprises:

generating a summary of operational states of the individual functions of the individual compute units of the compiled kernel, wherein the operational states include loop activity.

4. The method of claim 1, wherein the determining the operational data comprises:

generating a data mining script executable to generate a summary including at least one of operational states of the individual compute units of the compiled kernel or operational states of the individual functions of the individual compute units of the compiled kernel.

5. The method of claim 1, wherein the displaying the operational data comprises:

displaying a waveform view including the signals of the list hierarchically ordered based upon the individual compute units of the compiled kernel.

6. The method of claim 1, wherein the displaying the operational data comprises:

displaying a waveform view including the signals of the list hierarchically ordered based upon the individual compute units of the compiled kernel and the functions within the individual compute units.

7. The method of claim 1, wherein the displaying the operational data comprises:

displaying a waveform view indicating operational states of at least one of the individual compute units or the individual functions of the individual compute units of the compiled kernel, wherein the operational states include running time and stall time.

8. A system, comprising:

a processor configured to initiate operations including:

compiling a kernel, specified in a high level programming language, into a circuit design for implementation in an integrated circuit, wherein the circuit design includes the compiled kernel connected to static circuitry having an interface configured to couple the compiled kernel to a host system and having a memory controller configured to couple the compiled kernel to a memory;

generating metadata from the compiling, the metadata specifying a hierarchy of the kernel including a list of compute units of the kernel, functions of each compute unit, interfaces of the static circuitry to which the compiled kernel is coupled, and signals corresponding to the compute units and the functions;

comparing the signals of the compiled kernel from the metadata with a database specifying compiler generated signals for compute units and functions to determine a list of the signals of the compiled kernel connected to the static circuitry that match the compiler generated signals;

generating trace data by emulating the circuit design, wherein the trace data includes values for signals of the compiled kernel collected over time during the emulation;

determining, from values of the signals of the list within the trace data, operational data corresponding to individual compute units and individual functions of the compiled kernel; and displaying the operational data correlated with the individual compute units and functions of the compiled kernel.

9. The system of claim 8, wherein the determining the operational data comprises:

generating a summary of operational states of the individual compute units of the compiled kernel, wherein the operational states include running time and stall time.

10. The system of claim 8, wherein the determining the operational data comprises:

generating a summary of operational states of the individual functions of the individual compute units of the compiled kernel, wherein the operational states include loop activity.

11. The system of claim 8, wherein the determining the operational data comprises:

generating a data mining script executable to generate a summary including at least one of operational states of the individual compute units of the compiled kernel or operational states of the individual functions of the individual compute units of the compiled kernel.

12. The system of claim 8, wherein the displaying the operational data comprises:

displaying a waveform view including the signals of the list hierarchically ordered based upon the individual compute units of the compiled kernel.

13. The system of claim 8, wherein the displaying the operational data comprises:

displaying a waveform view including the signals of the list hierarchically ordered based upon the individual compute units of the compiled kernel and the functions within the individual compute units.

14. The system of claim 8, wherein the displaying the operational data comprises:

displaying a waveform view indicating operational states of at least one of the individual compute units or the individual functions of the individual compute units of the compiled kernel, wherein the operational states include running time and stall time.

15. A computer program product comprising a computer readable storage medium having program code stored thereon, the program code executable by a processor to perform operations comprising:

compiling a kernel, specified in a high level programming language, into a circuit design for implementation in an integrated circuit, wherein the circuit design includes the compiled kernel connected to static circuitry having an interface configured to couple the compiled kernel to a host system and having a memory controller configured to couple the compiled kernel to a memory;

generating metadata from the compiling, the metadata specifying a hierarchy of the kernel including a list of compute units of the kernel, functions of each compute unit, interfaces of the static circuitry to which the compiled kernel is coupled, and signals corresponding to the compute units and the functions;

comparing the signals of the compiled kernel from the metadata with a database specifying compiler generated signals for compute units and functions to determine a list of the signals of the compiled kernel connected to the static circuitry that match the compiler generated signals;

generating trace data by emulating the circuit design, wherein the trace data includes values for signals of the compiled kernel collected over time during the emulation;

determining, from values of the signals of the list within the trace data, operational data corresponding to individual compute units and individual functions of the compiled kernel; and displaying the operational data correlated with the individual compute units and functions of the compiled kernel.

16. The computer program product of claim 15, wherein the determining the operational data comprises:

generating a summary of operational states of the individual compute units of the compiled kernel, wherein the operational states include running time and stall time.

17. The computer program product of claim 15, wherein the determining the operational data comprises:

generating a summary of operational states of the individual functions of the individual compute units of the compiled kernel, wherein the operational states include loop activity.

18. The computer program product of claim 15, wherein the determining the operational data comprises:

generating a data mining script executable to generate a summary including at least one of operational states of the individual compute units of the compiled kernel or operational states of the individual functions of the individual compute units of the compiled kernel.

19. The computer program product of claim 15, wherein the displaying the operational data comprises:

displaying a waveform view including the signals of the list hierarchically ordered based upon the individual compute units of the compiled kernel.

20. The computer program product of claim 15, wherein the displaying the operational data comprises:

displaying a waveform view including the signals of the list hierarchically ordered based upon the individual compute units of the compiled kernel and the functions within the individual compute units.

* * * * *